No. 679,989. Patented Aug. 6, 1901.
G. H. PERKINS.
MOWER.
(Application filed Dec. 10, 1900.)
(No Model.) 2 Sheets—Sheet 1.

Witnesses
Inventor
Gardner H. Perkins
By Victor J. Evans. Attorney

No. 679,989. Patented Aug. 6, 1901.
G. H. PERKINS.
MOWER.
(Application filed Dec. 10, 1900.)

(No Model.) 2 Sheets—Sheet 2.

Inventor
Gardner H. Perkins

Witnesses

By Victor J. Evans. Attorney

UNITED STATES PATENT OFFICE.

GARDNER H. PERKINS, OF CAZENOVIA, NEW YORK.

MOWER.

SPECIFICATION forming part of Letters Patent No. 679,989, dated August 6, 1901.

Application filed December 10, 1900. Serial No. 39,403. (No model.)

*To all whom it may concern:*

Be it known that I, GARDNER H. PERKINS, a citizen of the United States, residing at Cazenovia, in the county of Madison and State of New York, have invented new and useful Improvements in Mowers, of which the following is a specification.

This invention relates to new and useful improvements in mowers especially adapted for use in distributing hay within barns, and its primary object is to provide a device which is adapted to travel upon a track suitably located within a barn and which is provided with means whereby it will automatically grasp a rafter and be retained in a position for spreading the hay discharged upon said mower.

With this and other objects in view the invention consists in providing a series of bars or tines which are connected at one end and are hinged at their connected end to a frame, which extends upwardly therefrom, and adjustable rods extending from the frame to the bars or tines, whereby the latter are adapted to be locked at the desired angle thereto. Spring-jaws are arranged at one end of the mower, and are adapted when the same is swung against a rafter to automatically grasp said rafter until released.

The invention also consists in providing a rail within the barn or other structure upon which is mounted a carriage carrying a rod, which extends upward from the frame and is swiveled to this carriage, thereby permitting the mower to be swung around to any desired position.

The invention also consists in certain novel features of construction and combination of parts, which will be hereinafter fully described and claimed, and illustrated in the accompanying drawings, showing the preferred form of my invention, and in which—

Figure 1:
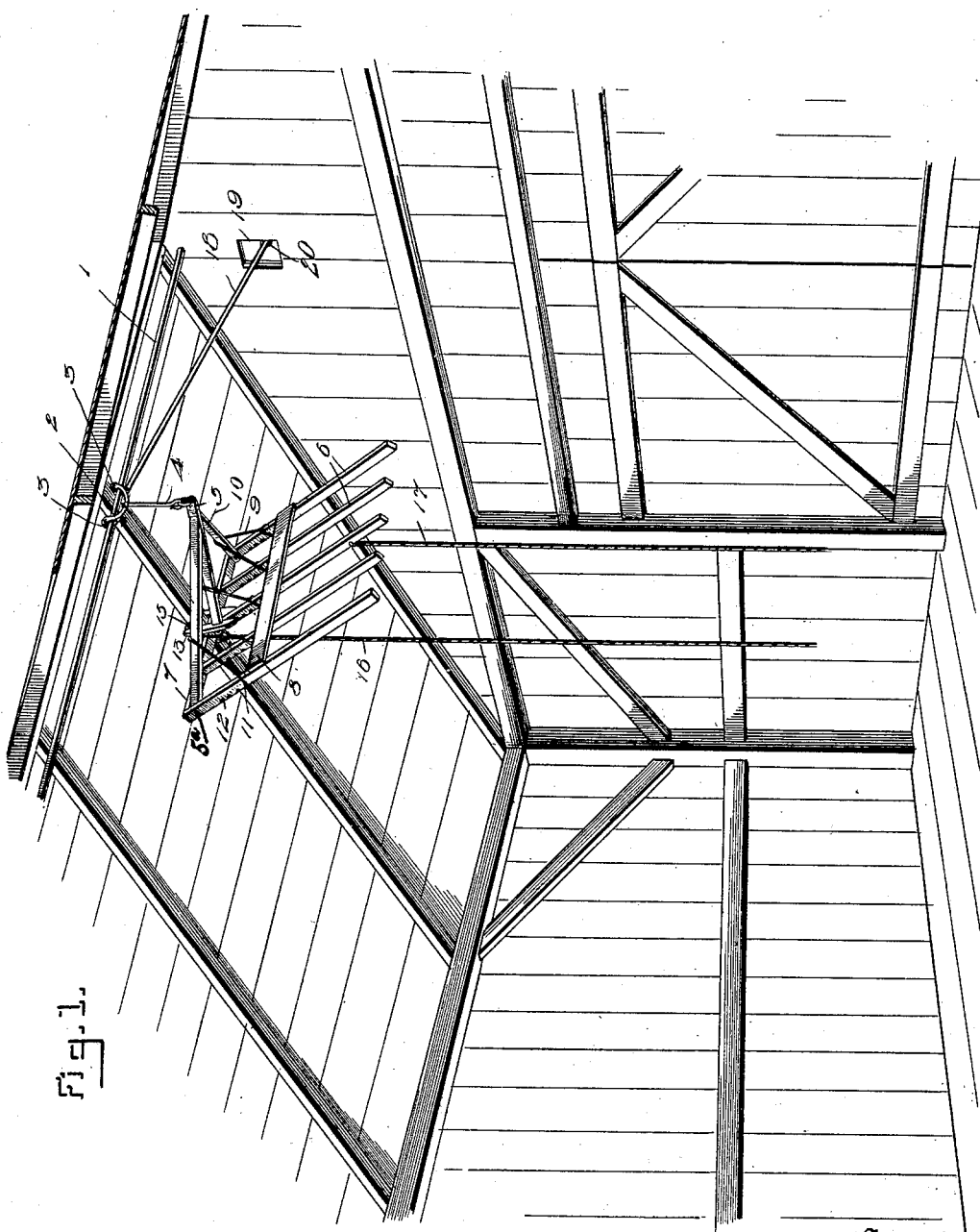
Figure 2:
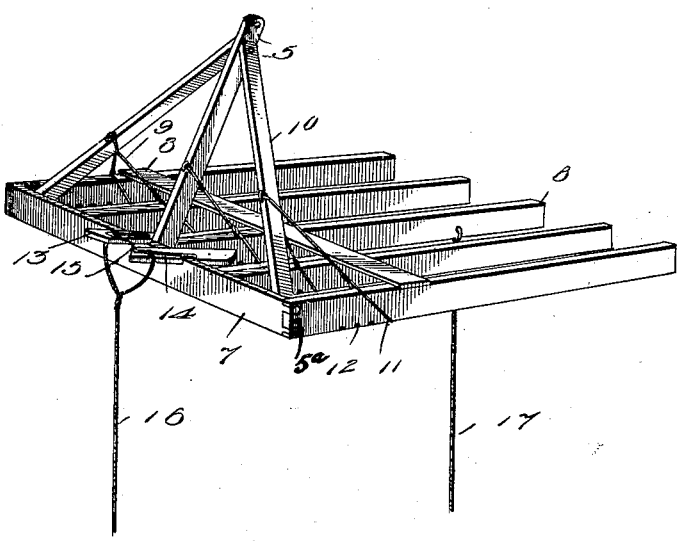
Figure 3:
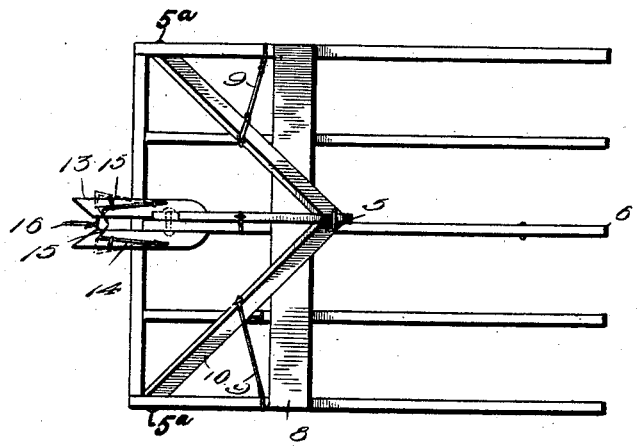

Figure 1 is a view of a portion of a barn, showing my improved mower in position therein. Fig. 2 is a perspective view of the mower detached. Fig. 3 is a top plan view thereof.

Referring to the drawings by numerals of reference, 1 is a rail or track which is arranged longitudinally within a barn or other structure and upon which is mounted a carriage preferably formed of a yoke 2, having rollers 3 at the ends thereof, which travel upon the rail. A rod 4 is swiveled to this yoke at the center thereof and is connected at its lower end to the apex of a triangular frame 5. This frame is pivoted at its lower end by pins 5ª to the body of the mower. This body comprises a series of parallel bars or tines 6, which are connected at one end by means of a cross-bar 7. A cross-strip or brace 8 is also provided, whereby the tines are prevented from moving from or toward each other. Rods 8 are secured to the strip 10, forming the frame 5, before referred to, and the lower end of each of these rods is provided with a loop 11, which is adapted to inclose one of the tines, said loop fitting within one of a series of notches 12, formed within the lower edge of the tine. It will be seen that by placing these loops in desired notches the angle at which the frame 5 is arranged to the tines may be readily regulated.

Extending from the rear face of the cross-strip 7 are parallel arms 13, the outer ends of which are beveled inward toward the center, as shown. Secured to the upper face of each of these arms is a spring-strip 14, having a sharpened hook 15 at the free end thereof, the ends of said hooks lying normally adjacent to each other. These hooks are so constructed that when the outer faces thereof come in contact with a fixed object said hooks will be forced apart.

A rope or cord 16 is connected to the spring-strips 14 and is adapted when pulled downward to draw the hooks apart, thereby releasing any object which may be grasped thereby. A rope 17 is also secured to the outer end of preferably the central tine of the mower, thereby permitting said mower to be swung in a desired direction.

A rod 18 is pivoted to the carriage 2 and is adapted to extend through a window or aperture 19 formed within one end of the barn. Suitable means, as a clamp 20, is provided whereby said rod may be locked upon the sill of the window 19 at any point.

When it is desired to fill a barn or mow with hay or other similar material, the mower is placed at the rear end of the structure and is swung against one of the rafters of the roof by means of the rope 17. As soon as said rafter comes into contact with the hooks 15 of the strips 14 said hooks will be forced apart and will engage the rafter and firmly grip the same until released. The mower will thus be held in an inclined position, as shown in Fig. 1, ready for use. The hay or straw is then carried by means of an ordinary horse-fork (not shown) to a point above the mower, where it is discharged, falling upon said mower and slipping off of the inclined tines thereof to one side of the barn or mow. After a sufficient amount of hay has been discharged upon the mower when the same is in this position the rope 16 is drawn downward, thereby releasing the hooks 15 from the rafter grasped thereby. The mower may then be swung around and placed into engagement with a rafter upon the opposite side of the roof, and the hay may then be discharged thereon and deposited at the opposite side of the barn.

The rod 18 is provided so as to prevent the movement of the carriage 2 when the mower is in operation. This rod is of sufficient length to permit the carriage to be moved back and forth thereby.

It will be understood that the operation herein described is repeated, the mower being gradually moved from one end of the barn to the other until the hay or other material is deposited evenly within the structure.

In the foregoing description I have embodied the preferred form of my invention; but I do not wish to be understood as limiting myself thereto, as I am aware that modifications may be made therein without departing from the principle or sacrificing any of the advantages thereof, and I therefore reserve to myself the right to make such changes as fairly fall within the scope of my invention.

Having thus described the invention, what is claimed, and desired to be secured by Letters Patent, is—

1. A mower comprising tines connected at one end, a frame hinged to the tines, at their connected end, and means connecting the frame with the tines for adjusting the frame to a desired angle to said tines.

2. A mower comprising parallel tines, a cross-strip connecting the same at one end thereof, a frame hinged to the tines, rods extending therefrom and engaging the tines, and means for adjusting said rods back and forth upon the tines, thereby securing the frame at a desired angle thereto.

3. A mower comprising parallel tines, a cross-strip connecting the same at one end thereof, a frame hinged to the tines, rods extending therefrom and adapted to engage any one of a series of recesses in each tine, a carriage, and a rod secured to the frame and swiveled within said carriage.

4. In a mower, the combination with parallel tines connected at one end; of a frame hinged thereto, arms extending from the mower, spring-hooks secured to the arms and normally in position adjacent to each other, and means for separating the hooks.

5. In a mower, the combination with parallel tines; of a cross-strip at one end of the mower connecting the tines, a frame hinged to the mower, means for adjusting the free end of the frame from or toward the mower, arms extending from the cross-strip, spring-hooks secured thereto and lying normally adjacent to each other, and means for separating the hooks.

6. In a mower, the combination with parallel tines; of a cross-strip connecting said tines at one end of the mower, a frame hinged to the mower, braces connecting said frame and tines, whereby the frame may be hooked at a desired angle to the mower, arms extending from the cross-strip, spring-hooks secured thereto and lying normally adjacent to each other, means for separating the hooks, a carriage, and a rod swiveled to said carriage and secured to the frame.

7. In a mower, the combination with parallel tines; of a cross-strip connecting said tines at one end of the mower, a brace upon the tines, a frame hinged to the mower, rods secured to the frame and adjustably secured to the tines, whereby the free end of the frame may be adjusted from or toward said tines, arms extending from the cross-strip, spring-strips secured to the arms and having inwardly-inclined hooks lying normally adjacent to each other, means for separating the hooks, a carriage, a rod swiveled thereto and secured to the frame, a flexible strip secured to one of the tines, and a rod secured to the carriage.

In testimony whereof I affix my signature in presence of two witnesses.

GARDNER H. PERKINS.

Witnesses:
CHAS. T. GREENLAND,
A. LOCKMAN.